United States Patent [19]
Uchiyama et al.

[11] Patent Number: 5,847,342
[45] Date of Patent: Dec. 8, 1998

[54] COMBINATION SWITCH APPARATUS EQUIPPED WITH ROTARY CONNECTOR

[75] Inventors: Norio Uchiyama; Yoshio Hattori, both of Tokyo, Japan

[73] Assignee: Niles Parts Co., Ltd., Japan

[21] Appl. No.: 678,077

[22] Filed: Jul. 10, 1996

[30] Foreign Application Priority Data

Nov. 1, 1995 [JP] Japan .................................. 7-308129

[51] Int. Cl.$^6$ .................................................. H01R 39/00
[52] U.S. Cl. ........................................ 200/61.54; 439/15
[58] Field of Search ............................... 200/61.27, 61.3, 200/61.32, 61.35, 61.36, 61.38, 61.54–61.56; 439/11, 13, 15, 16, 34, 164, 488, 491, 492; 74/484 R, 484 H, 492, 552

[56] References Cited

U.S. PATENT DOCUMENTS

| | | | |
|---|---|---|---|
| 4,422,699 | 12/1983 | Sakurai et al. | 339/3 S |
| 4,451,105 | 5/1984 | Sakurai | 339/113 R |
| 4,840,078 | 6/1989 | Shitanoki | 74/484 R |
| 5,144,860 | 9/1992 | Furuhashi et al. | 74/552 |

FOREIGN PATENT DOCUMENTS 1-89491  6/1989  Japan .............................. H01H 35/04

*Primary Examiner*—Michael L. Gellner
*Assistant Examiner*—Michael A. Friedhofer
*Attorney, Agent, or Firm*—Ronald P. Kananen

[57] ABSTRACT

A combination switch (1) includes a wiper switch (11) and a lighting switch (12) that are fitted to a main body (10). A connection member (26) is accommodated in an accommodation space (23) defined by the main body (10) of the combination switch (1) and a rotor housing (24), and electrically connects a circuit on the chassis to a circuit on a steering wheel. The rotor housing (24) is engaged with the steering wheel by pins (241, 242) and is rotatably held by a rotor attachment (25) to the main body (10) of the combination switch (1). The result is a small combination switch apparatus combined with a rotary connector, which requires fewer parts and can be assembled by a small number of steps at a car production site.

6 Claims, 2 Drawing Sheets

COMBINATION SWITCH APPARATUS EQUIPPED WITH ROTARY CONNECTOR

BACKGROUND OF THE INVENTION

1. Field of the Invention

The present invention relates generally to rotary connectors and switches and, in particular, to a combination switch apparatus with a rotary connector for electrically connecting circuits on an automotive chassis to an air bag device or other electrical load device mounted on a steering wheel.

2. Description of the Related Art

Rotary connectors using a flat cable or a spring have been developed in the past as means for electrically connecting an air bag device and other electrical devices mounted on a steering wheel to a car body side circuit. As described in Japanese Utility Model Laid-Open No. 1-189491 (1989), the rotary connector is produced as a separate member from a combination switch.

Therefore, the conventional rotary connector requires screws and other exclusive components for fitting it to the combination switch and involves the problems that a large number of constituent components is required, the production cost is high, and an operation factor of assembly is low. Another problem is that the overall size when the combination switch is fitted to the rotary connector increases. Further, because the combination switch is fitted to a bracket of a steering column by screws, and then the rotary connector is fitted to the combination switch, the fitting work of the rotary connector to the combination switch must be carried out on a car assembly line, so that the number of production steps at the car production site increases.

SUMMARY OF THE INVENTION

An object of the present invention is to solve the problems associated with the conventional rotary connector and switch structure described above.

More specifically, it is an object of the present invention to solve the problems described above by providing a combination switch apparatus that has a small total number of components for both a rotary connector and a combination switch, that is small in size, and that is equipped with the rotary connector requiring a small number of assembly steps at a car production site.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, the combination switch apparatus comprises a combination switch fitted to a steering column of a vehicle and provided concentratedly with a plurality of switches for operating various loads in the vehicle, and a rotary connector having terminals for electrically connecting circuits on the vehicle chassis to circuits on a steering wheel, wherein the combination switch includes a main body to which a rotor housing provided on the steering wheel is rotatably connected, and a connection member is placed in a space defined by the main body and the rotor housing.

It is preferred that the rotary connector of the combination switch apparatus is equipped with a rotor attachment fitted to the rotor housing and rotatably supporting the rotor housing with respect to the main body of the combination switch.

It is also preferred that the combination switch apparatus according to the present invention includes a switch with a pawl for automatically cancelling a turn signal, and the rotor attachment has a cancel cam to be engaged with the pawl.

It is also preferred that the connection member of the combination switch apparatus according to the present invention comprises a flat cable whose ends are connected to the terminals, respectively.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE PREFERRED EMBODIMENTS

Figure 1:
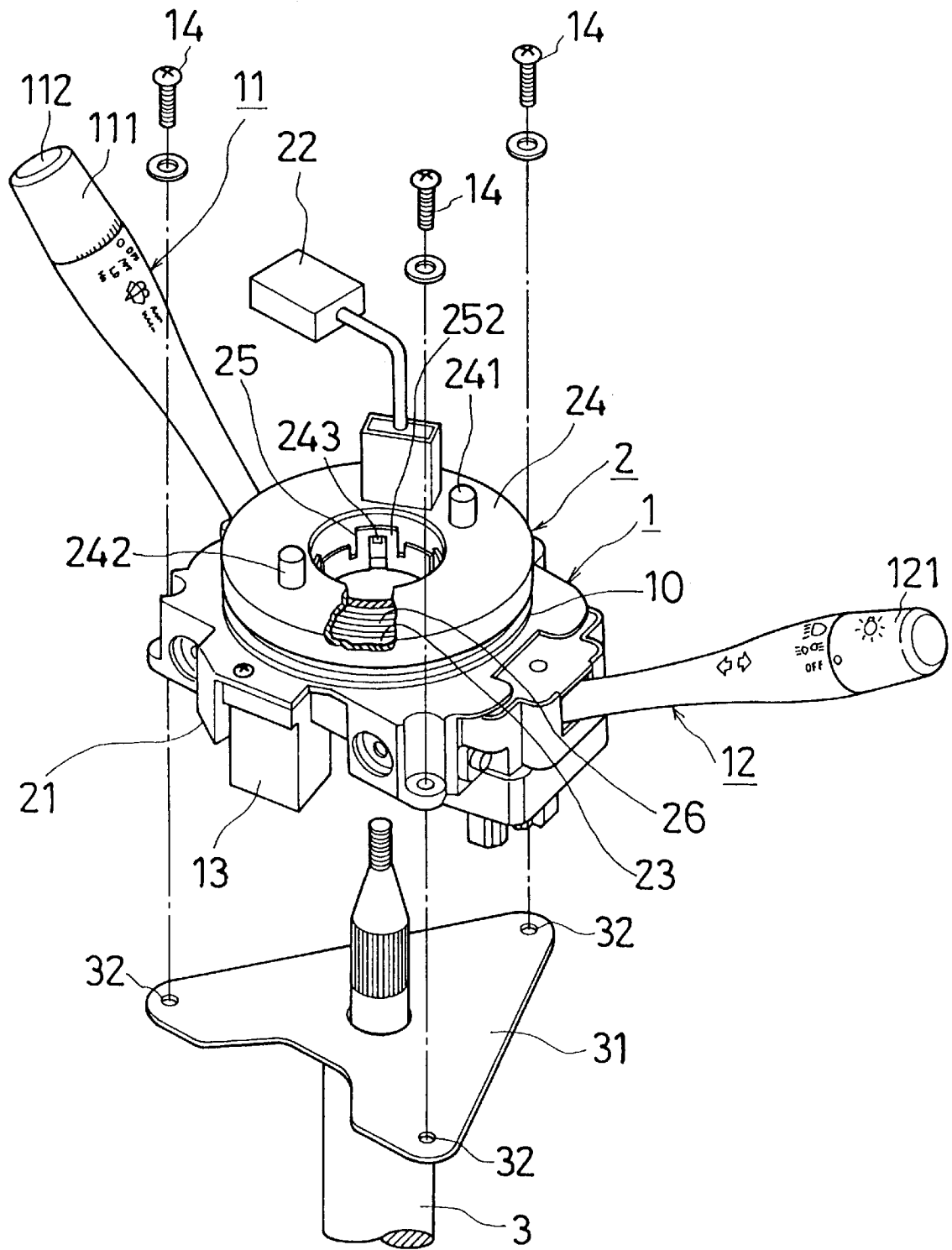
FIG. 1 is an exploded perspective view showing a preferred embodiment of the present invention.
Figure 2:
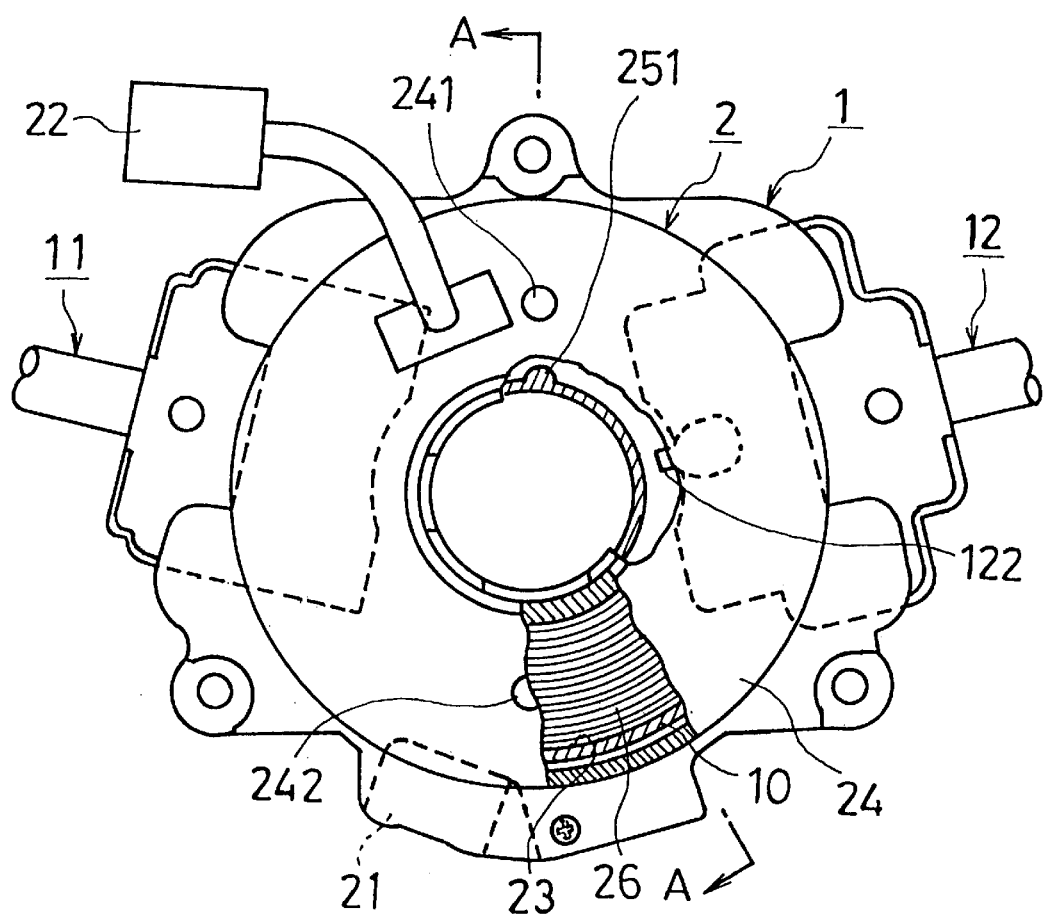
FIG. 2 is a top view of the embodiment shown in FIG. 1.
Figure 3:
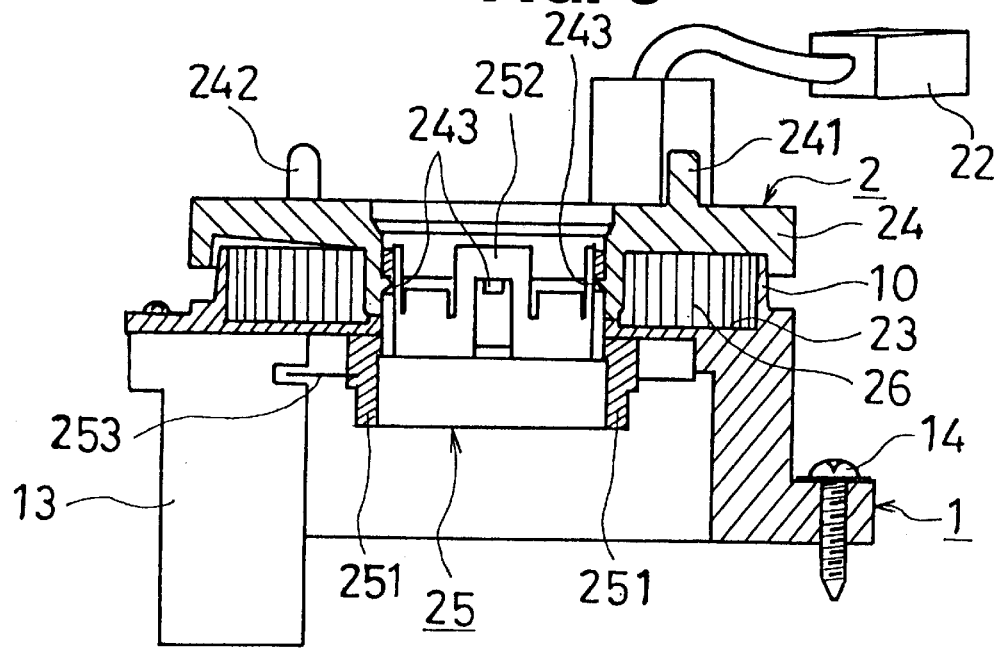
FIG. 3 is a sectional view taken along line A—A in FIG. 2.

A preferred embodiment of the present invention will be explained with reference to FIGS. 1 to 3 of the accompanying drawings.

Reference numeral 1 denotes a combination switch, which includes a body 10, a wiper switch 11, and a lighting switch 12.

The wiper switch 11, which is used for operating loads such as a wiper motor and a washer motor of a vehicle, includes a lever 111 and a push button 112 at its distal end. The lighting switch 12, which is used for operating loads such as head lamps, small lamps, fog lamps and turn signal lamps, includes a rotary knob 121 at its distal end, and a pawl 122 for automatically cancelling the turn signal, as shown in FIG. 2.

The combination switch 1 is fitted to a steering column 3 by fastening screws 14, 14, 14 into holes 32, 32, 32 of a bracket 31 of the steering column 3.

Reference numeral 2 denotes a rotary connector for electrically connecting a circuit on the chassis, such as an air bag controller (not shown in the drawing), to a circuit on the steering side, such as an air bag inflator (not shown). This connector includes one terminal 21 connected to the circuit on the chassis and another terminal 22 connected to the circuit on the steering side.

The rotary connector 2 is rotatable with respect to the main body 10 of the combination switch 1 and is equipped with a rotor housing 24 engaged with a steering wheel (not shown) through pins 241, 242.

A connection member 26 comprising a flat cable is spirally wound and accommodated in a doughnut space defined between the main body 10 of the combination switch 1 and the rotor housing 24, and the ends of this connection member 26 are connected to the terminals 21, 22 described above, respectively. The connection member 26 is a cable made of a plurality of conductive ribbons laminated with a resin film such as a PET (polyethylene terephthalate) resin.

The rotary connector 2 is further equipped with a rotor attachment 25, which rotatably holds the rotor housing 24 with respect to the main body 10 of the combination switch 1 and includes a cancel cam 251, a resilient plate 252 and a slit board 253.

The cancel cam 251 is so disposed as to correspond to the pawl 122 of the lighting switch 12 and can automatically return it from either of the turn signal positions to the neutral position when the pawl 122 comes into contact with the cancel cam 251.

The resilient plate 252 is the portion that is engaged with the pawl 243 formed on the rotor housing 24.

When combined with a sensor body 13 fitted to the combination switch 1, the slit board 253 constitutes a steering angle sensor, and a plurality of slits (not shown) are aligned on the circumference.

Next, the operation of the embodiment described above will be explained.

First, the operation of the combination switch 1 will be explained. When the wiper switch 11 is set to INT (intermittent), LO (low speed) and HI (high speed) from OFF, for example, the wiper motor (not shown) operates in the corresponding mode and moves a wiper blade to wipe a window glass sheet.

When the rotary knob 111 of the wiper switch 11 is rotated to the INT position, an intermittent time corresponding to the rotating position is set.

When the push button 112 of the wiper system switch 11 is pushed and operated, the washer motor (not shown) operates, and a washing liquid is jetted to the windshield.

Next, when the rotary knob 121 of the light switch 12 is rotated from the OFF position to the small lamp ON position or the head lamp ON position, the corresponding lamp of the vehicle is turned ON.

When the light switch 12 is moved to the right-turn position or the left-turn position, the turn signal lamps on the corresponding side flash. At this time, the pawl 122 protrudes from the lighting switch 12 into the moving range of the cancel cam 251. When the steering wheel is returned from the right/left turn position to the neutral position, the cancel cam 251 comes into contact with the pawl 122 and consequently, the lighting switch 12 automatically returns from the inclined position to the original position.

Next, the operation of the rotary connector 2 will be explained. The rotor housing 24 of the rotary connector 2 is rotated when the steering wheel is operated. At this time, the connection member 26 accommodated in the accommodation space 23 is wound or rewound inside the accommodation space in such a mariner as to follow the rotation of the rotor housing 24. When the vehicle comes into collision, for example, an electrical signal is outputted from the air bag controller on the car body side to the inflator on the steering wheel side through the connection member 26 of the rotary connector 2, so that the inflator operates and inflates the air bag.

Because of the construction and function described above, the present invention provides the effects that the total number of components of the rotary connector and the combination switch can be reduced, the size of the combination switch can be reduced, and the number of assembly steps at the car production site can be reduced.

It will be appreciated that the present invention is not limited to the exact construction that has been described above and illustrated in the accompanying drawings, and that various modifications and changes can be made without departing from the scope thereof. For example, while the connection member 26 in the embodiment described above comprises a flat cable, a spring can also be used as the connection member. Also, the cancel cam 251 and the slit board 253 may be separated from the rotor attachment.

It is intended that the scope of the invention only be limited by the appended claims.

What is claimed is:

1. A combination switch apparatus, comprising:

a combination switch (1) fitted to a steering column (3) of a vehicle and provided concentratedly with a plurality of switches (11, 12) for operating various loads in the vehicle; and a rotary connector (2) having terminals (21, 22) for electrically connecting circuits on a chassis of the vehicle with circuits on a steering wheel of the vehicle;

wherein said combination switch (1) includes a main body (10) having an upper surface to which a rotor housing (24) of the rotary connector (2) is rotatably connected, and a connection member (26) of the rotary connector (2) is placed in a space (23) defined by the upper surface of the main body and the rotor housing.

2. A combination switch apparatus according to claim 1, wherein said rotary connector (2) is equipped with a rotor attachment (25) fitted to said rotor housing (24), said rotor attachment (25) securing together and rotatably supporting said rotor housing (24) with respect to said main body (10) of said combination switch (1).

3. A combination switch apparatus according to claim 2, wherein said combination switch (1) includes a switch (12) with a pawl (122) for automatically cancelling a turn signal, and said rotor attachment (25) has a cancel cam (251) to be engaged with said pawl (122).

4. A combination switch apparatus according to claim 1, wherein said connection member (26) comprises a flat cable whose ends are connected to said terminals (21, 22), respectively.

5. An integral combination switch apparatus and rotary connector for a vehicle, comprising:

a main body having a central opening for fitting over a steering column of a vehicle, said main body having an upper surface that defines a doughnut-shaped accommodation space disposed generally coaxially about said central opening, said main body housing a wiper switch assembly and a lighting switch assembly for operating wipers and lights of a vehicle, respectively; and a rotary connector mounted to said main body and covering said accommodation space, said rotary connector having first and second terminals for electrically connecting the rotary connector to circuits on a chassis and circuits on a steering wheel of a vehicle, respectively, and a connection member placed in said accommodation space and having first and second ends connected to said first and second terminals, respectively.

6. An integral combination switch apparatus and rotary connector according to claim 5, wherein said connection member comprises a flat cable whose ends are connected to said first and second terminals, respectively.

* * * * *

Adverse Decision In Interference

Patent No. 5,847,342, Yoshio Hattori, COMBINATION SWITCH APPARATUS EQUIPPED WITH ROTARY CONNECTOR, Interference No. 104,793, final judgment adverse to the patentee rendered October 25, 2002 as to claims 1 and 4-6.

*(Official Gazette December 24, 2002)*